March 27, 1956  A. GIAMBERTONI  2,739,525
ELECTRIC BREAD-TOASTER
Filed March 2, 1953  2 Sheets-Sheet 1
Fig. 1
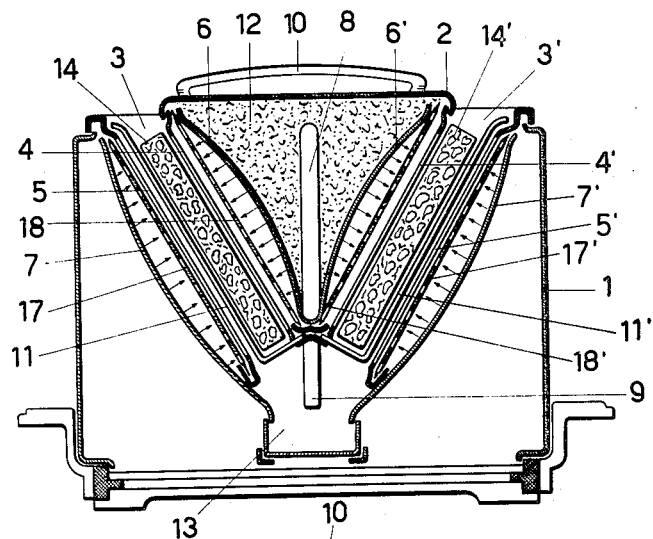
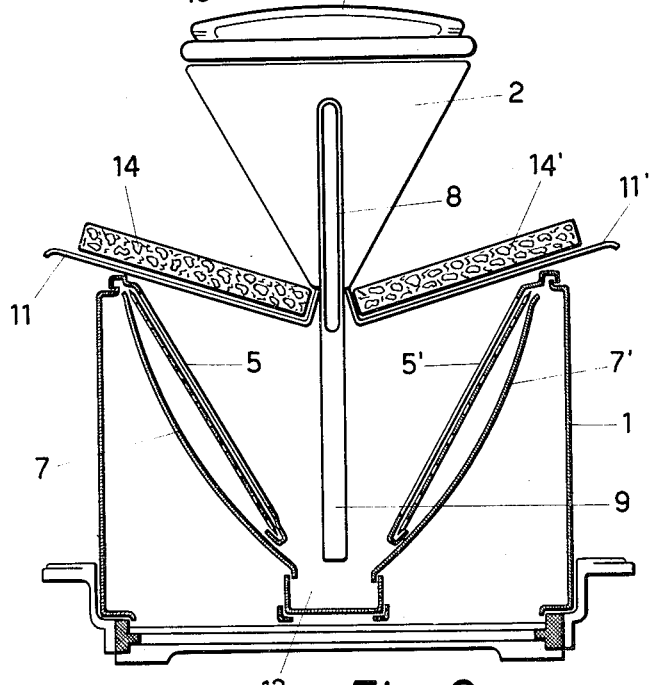
Fig. 2
INVENTOR.
Andrea Giambertoni
BY
Stevens, Davis, Miller & Mosher
his attorneys

United States Patent Office 2,739,525
Patented Mar. 27, 1956

2,739,525

ELECTRIC BREAD-TOASTER

Andrea Giambertoni, Milan, Italy

Application March 2, 1953, Serial No. 339,725

Claims priority, application Italy May 5, 1952

5 Claims. (Cl. 99—391)

In the construction of bread-toasters, heretofore almost always one constructional principle has been followed, that is that of providing at the upper part of a box of suitable shape two slits through which the slices of bread to be toasted are vertically to be introduced. The introduction of said slices of bread is carried out by hand or by means of convenient metal pincers and in general the source of heat is constituted by three resistors of insulated nickel-chrome-iron, of which the central one is double-faced. Said bread-toasting devices, which generally had been used only to brown bread, were also used further on to toast sandwiches and this new use has necessarily required the enlarging of the slits so that said slices of sandwiched bread might be introduced. Since the thickness of the slices of bread is not always uniform, it happens in practice that the introduction of the slices offers difficulty sometimes.

Independently of such difficulty, which in part is obviated by using pincers as mentioned, there is however the inconvenience that if the hollow is too narrow, it is not possible to introduce sandwiches and if the hollow is too wide the sandwiches are not sufficiently adherent to the heating walls, and not compressed to an extent warranting thorough toasting.

The present invention concerns an electric bread-toaster which eliminates the aforementioned inconveniences and is characterized in that the toasting chambers are constituted by two fixed parts inclined to form a V with the vertex towards the base of the toaster and by the walls of a wedge slidable along a vertical plane passing through the vertex of said V. Hereinafter is illustrated with reference to the accompanying drawing one embodiment by way of example.

In said drawing:

Fig. 1 is a longitudinal section of the bread-toaster in operating position;

Fig. 2 is a longitudinal section thereof in the position for charging the slices of bread;

Figure 3:
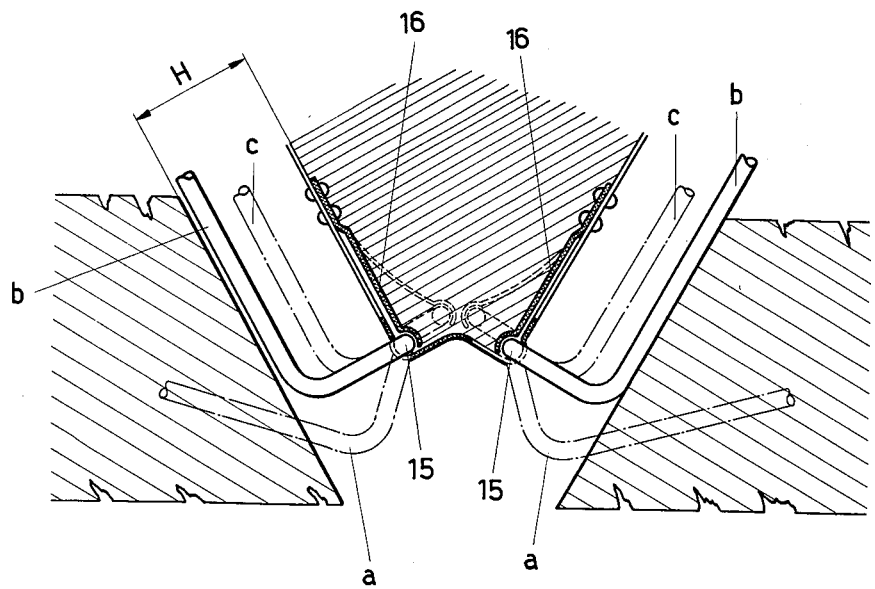
Fig. 3 is a longitudinal section of a particular in enlarged scale.

With reference to Figures 1 and 2, with 1 is designated a box inside which and coaxially with said box there is provided the body 2 having the shape of a wedge, which forms with said box the toasting chambers 3 and 3'. The faces 4—4' and 5—5' respectively of the body 2 and of the box 1 forming said toasting chambers, are constituted by grills or perforated plates on the backside whereof, in order to increase heat radiation towards the slices of bread or sandwiches, there are provided specular surfaces 6—6' and 7—7' respectively in the body 2 and in the box 1, between said specular surfaces and the grills or perforated plates being accommodated the electric resistors 17, 17' and 18, 18'. The wedge possesses a pin 8 guided slidable in the tube 9 rigid with the box and can therefore be lifted or lowered vertically by means of the handle 10. At the tapered end of the wedge there are applied symmetrically and hingedly the grills 11—11' which are adapted to be received respectively by the toasting chambers 3 and 3'. In order to prevent heat dispersion in upward direction, not only to concentrate most of said heat in the direction towards the bread but also to avoid overheating the handle 10, there is provided in the wedge 2 a packing of antithermal material 12 (e. g. glass wool). On the bottom of the box 1 and coaxially thereto there is provided the extractable drawer 13 for collecting toasting residues.

Operation is as follows:

After lifting the wedge 2 (Fig. 2) by means of the handle 10, the slices of bread or sandwiches 14—14' are laid on the grills 11 and 11' which are in open position. As said grills are connected with said wedge 2 by hinging, the introduction of the wedge into the box causes said grills to be gradually received in the toasting chambers 3 and 3', the grills approaching thus to the wedge faces and thus the slices of bread or the sandwiches are introduced into said chambers (Fig. 1). The wedge permits to make the dimension H (s. Fig. 3) of said chambers proportioned to the thickness of the slices of bread or sandwiches, thanks also to the particular connection of the grills 11 and 11' as illustrated in Fig. 3 and described hereinafter. The wedge will remain more or less lifted, but the bread will always be sufficiently compressed and sufficiently close to the heating resistors.

The present invention has also the advantage that the toasting chambers 3—3', instead of being in the vertical sense, are inclined according to generating lines of the wedge 2, so that it becomes easier in this way to introduce the slices of bread or sandwiches into said chambers.

The invention hereinbefore described may be supplemented with other contrivances known per se, such as for example the introduction of a thermostat making the wedge 2 jump up by release when the toasting chambers have reached the right temperature at which the bread is toasted to the desired degree.

The connection of the grills 11 and 11' to the wedge is embodied in such a manner that by lowering the wedge, the grills can be brought close to the faces of the wedge as much as allowed for by the thickness of the bread slices or sandwiches. In the drawing there is represented one of the possible solutions: each grill has L-shape, the end of their shorter side penetrates into a slit provided at the tapered end of the wedge 2 and with its cylindrical terminal 15 it is hinged in a cylindrical channel offered by the end of an elastic lamina 16 fixed at the other end to the wedge which in correspondence with these laminae has recesses permitting said laminae to inflect towards the intermediate plane of the wedge.

The aforesaid slit is such that the grill can rotate in said cylindrical seat of channel-shape, opening in respect to the wedge faces as shown in Fig. 3 by the dash-and-dot lines *a* or becoming parallel to the wedge faces (solid lines *b*). If eventually owing to the further lowering of the wedge in respect to the box the distance H diminishes, the terminal of the grill fulcrumed on the elastic lamina is displaced by effect of the yielding thereof to the positions marked with dash-and-dot lines *c* although keeping parallel to the wedge face with its face corresponding to the longer side of the L.

What I claim is:

1. A toaster comprising a housing having a substantially wedge-shaped heating compartment having an open major end and spaced apart confronting walls which diverge toward the open major end, heating elements positioned on a pair of opposing walls of said compartment, a wedge-shaped member adapted to be rectilinearly moved into and out of said compartment, and having a pair of opposing walls which substantially parallel the divergent walls of the heating compartment, heating elements on said walls of the member whereby the heating elements of said member and of said compartment face each other, a pair of grills to carry the toast and means to oppositely pivotally mount said grills at substantially the apex of said wedge-shaped member.

2. A toaster as defined by claim 1 further including a plurality of grills covering each heating element on the side thereof exposed to the interior of said compartment.

3. A toaster as defined by claim 1 wherein said toast-carrying grills are L-shaped in cross-section and the shorter leg thereof is pivoted to the apex of said wedge-shaped member.

4. A toaster as defined by claim 3 wherein said means to mount said L grills include two flexible members mounted to said wedge-shaped member, each flexible member being mounted near said apex and extending toward said apex, said flexible members normally overlying a channel cut in the walls of said wedge-shaped member near the apex thereof and means to mount said L grills to said flexible member.

5. A toaster comprising a housing having a substantially wedged shaped heating compartment defined by spaced apart confronting plane surfaces, a minor end and an open major end, said surfaces diverging toward the major end, a wedged shaped member movable in a rectilinear path into and out of the recess through the open major end, said member having opposing side surfaces which substantially parallel the plane surfaces of the compartment, heating elements carried by the plane surfaces of the compartment and by the opposing surfaces of the wedged shaped member, a pair of grills for carrying slices of bread and holding them between the heating elements on the plane surfaces and the opposing side surfaces and means for pivotally mounting said grills at substantially the apex of said wedged shaped member so that when the member is positioned within the compartment the grills hold the slices between the heating elements and when the member is positioned outward of the compartment the grills swing away from the side surfaces of the wedged shaped member.

References Cited in the file of this patent

UNITED STATES PATENTS

| | | |
|---|---|---|
| 1,769,973 | Wells | July 8, 1930 |
| 1,979,845 | Schallis | Nov. 6, 1934 |
| 2,194,859 | Malmquist et al. | Mar. 26, 1940 |
| 2,473,402 | Wood | June 14, 1949 |
| 2,497,205 | Brewton | Feb. 14, 1950 |
| 2,604,841 | Kirby | July 29, 1952 |